March 8, 1966      D. A. DIXON      3,239,360
METHOD FOR TRANSPORTING PRODUCE UNDER CONTROLLED ATMOSPHERE
Filed April 1, 1964      2 Sheets-Sheet 1
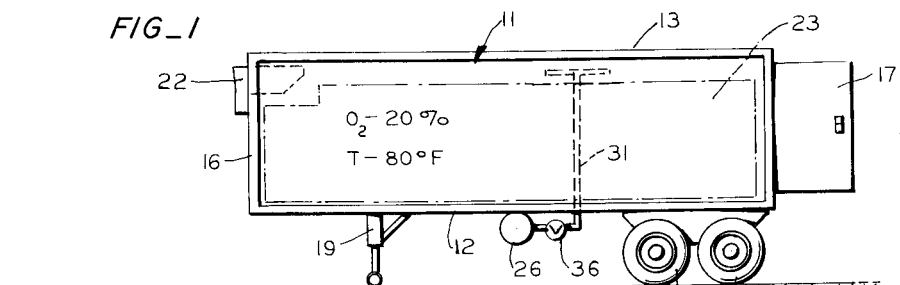
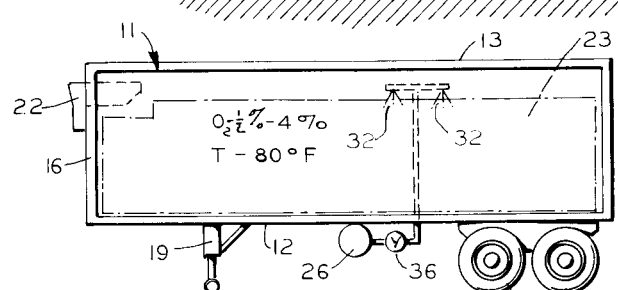
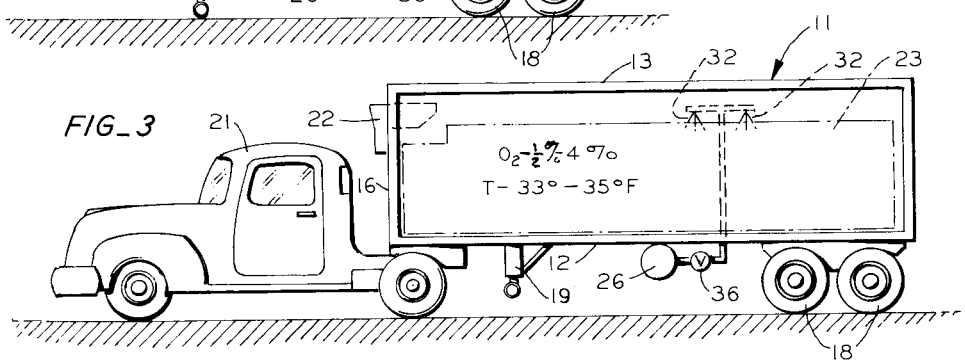
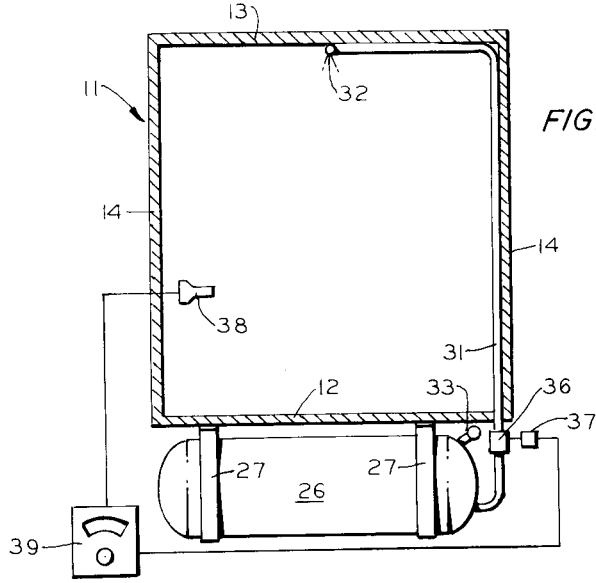
INVENTOR.
DAVID A. DIXON
BY Julian Caplan
ATTORNEY

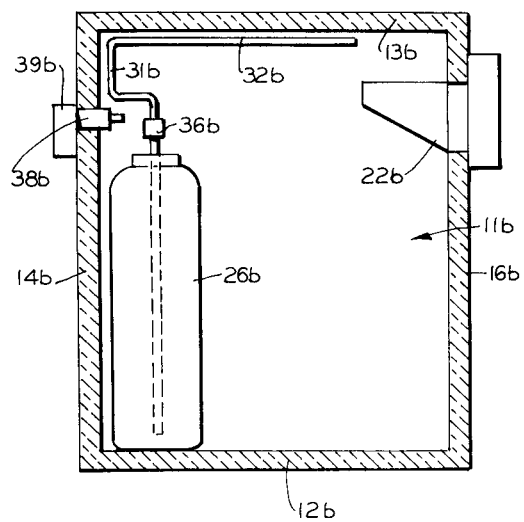
FIG_5
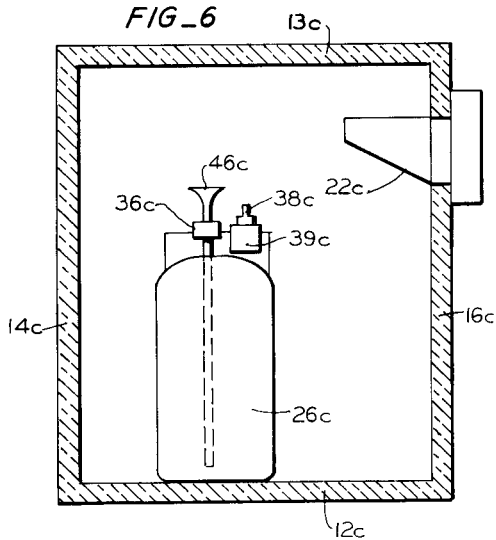
FIG_6
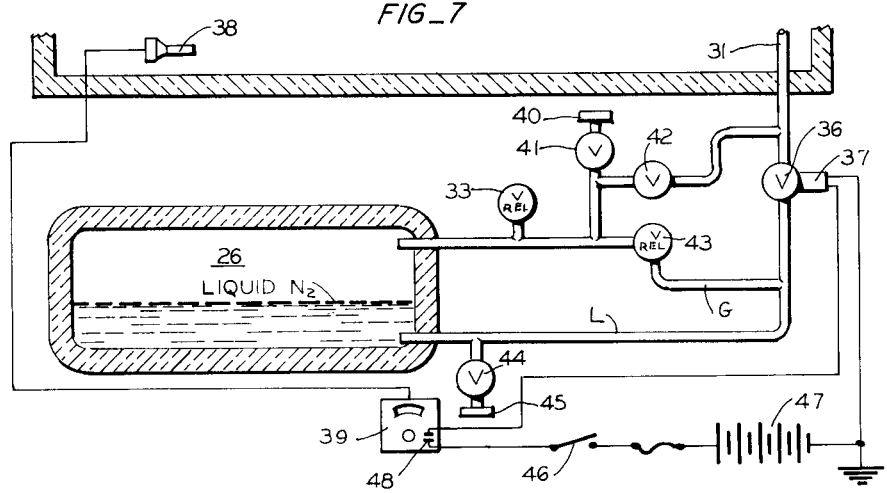
FIG_7
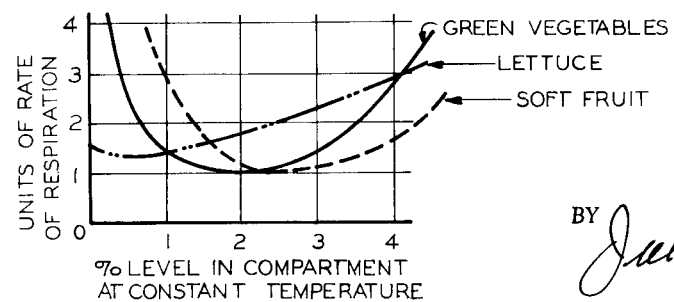
FIG_8
INVENTOR.
DAVID A. DIXON
BY Julian Caplan
ATTORNEY

United States Patent Office

3,239,360
Patented Mar. 8, 1966

3,239,360
METHOD FOR TRANSPORTING PRODUCE UNDER CONTROLLED ATMOSPHERE
David A. Dixon, San Anselmo, Calif., assignor to The Best Fertilizers Co., Lathrop, Calif.
Filed Apr. 1, 1964, Ser. No. 356,624
3 Claims. (Cl. 99—154)

This invention relates to a new and improved method and apparatus for transporting produce such as fresh fruits and vegetables under a controlled atmosphere. More particularly, the invention provides for rapid, initial reduction in the oxygen content of the compartment surrounding the produce to a level set between ½% to 4% and then accurately maintaining such low oxygen level for the duration of transportation.

A principal economic loss occurring during transportation of produce, such as fresh fruits and vegetables, is the degradation thereof which occurs between the field and the ultimate destination attributable to the effect of respiration. Heretofore, a conventional attempt to reduce such degradation is to refrigerate the produce to reduce the rate of respiration. One of the important problems which conventional refrigeration does not solve is the inherent time lag which occurs between the original receipt of the produce at its field temperature and the required reduced temperature. A substantial amount of the total degradation of produce occurs during this time lag. Accordingly, it is a principal object of the present invention to greatly decrease respiration during the time between the receipt of produce from the field and its reduction to the refrigeration temperature. This result is accomplished by purging the atmosphere in a refrigerator compartment with a large volume of nitrogen which diffuses throughout the refrigeration compartment, the containers for the produce, and even in the produce itself. The oxygen present in the atmosphere in the refrigerated compartment is therefore diluted and displaced and thus reduced to a level set between ½% to 4% as contrasted with a level of about 20% in the normal atmosphere. Reduction of the oxygen to a low level, such as ½% to 4%, greatly inhibits the rate of degradation of the produce.

Heretofore, other attempts have been made to inhibit initial degradation. One means heretofore employed is precooling the refrigerator compartment, but this requires a source of ice or large refrigeration equipment to accomplish precooling. Another attempt to reduce initial degradation has been vacuum cooling which is accomplished by evacuating the compartment, thereby evaporating a portion of the moisture present in the produce and thus reducing the temperature of the produce. Vacuum cooling, however, requires a centrally located vacuumizing plant. The expense of precooling and vacuum cooling plants and the inconvenience, cost, and delay in transporting the produce to such central plant is eliminated by the present invention.

Incidental to the reduction in the percentage of oxygen by reason of rapid evaporation of nitrogen within the refrigeration compartment is a refrigeration effect attributable to the heat of vaporization of the liquefied gas. This reduces to a certain extent the workload of the mechanical or other refrigerator but this is not the primary purpose and effect of the emission of nitrogen into the refrigerating compartment. At the present time, one type of refrigeration is accomplished by evaporation of liquefied nitrogen into the refrigeration compartment, the rate of introduction and vaporization being governed by temperature within the compartment as distinguished from the percentage of oxygen in the atmosphere as is the case in the present invention. Accordingly, conventional nitrogen refrigeration methods and apparatus do not accomplish the same results as in the present invention, namely, a precise control of the oxygen level.

As hereinafter set forth in greater detail, after the initial reduction of the oxygen content by purging the compartment with nitrogen gas, the oxygen is maintained at same chosen level in the range of ½% to 4%, usually at about 2%, by means of commercially available equipment which senses the percentage of oxygen and which regulates a valve controlling the delivery of nitrogen into the refrigeration compartment. Thus, additional nitrogen is introduced to balance against leakage of outside air into the compartment through the walls and doors of the compartment and, also, to balance the emission of traces of various gases which naturally escape from the produce.

The set level of oxygen is preferably very precisely controlled at a certain percentage, which varies for different types of produce, but is generally in the range of 1% to 4%. For most produce the level is 2% to 2½% $O_2$, balance $N_2$. Equipment commercially available will control oxygen level within plus or minus 0.1% of set point under ideal conditions. Inaccuracies in the total system, such as rate of diffusion of $N_2$ and $O_2$, purge convection currents, and the like, reduce accuracy under dynamic conditions to plus or minus ½% of set point; under static conditions to plus or minus ¼%. Green produce at 2% $O_2$ has a respiration rate of one-sixth that at normal atmosphere as contrasted with a respiration rate of one-third normal at 4%. For soft fruits, 3½% $O_2$ is best and at 1% the danger of anaerobic respiration is great. FIG. 8 is a graph showing effect of variations of $O_2$ level on rate of respiration of produce.

A feature of the invention is the fact that the oxygen level is not brought too low. If the oxygen in the atmosphere is below certain levels, usually 1%, anaerobic respiration accomplishes serious degradation of the produce. Accordingly, it is a principal purpose of the present invention to so accurately control the amount of oxygen in the atmosphere that degradation is minimized either from oxidation (i.e., respiration) of the produce or from anaerobic action. Although it has been stated that nitrogen is used in accordance with the present invention, it will further be understood that other inert gases or which argon is a typical example, may be substituted or mixed. The gases are transported in containers at low temperatures and low pressure in liquid state. An insulation is accomplished to reduce the tendency to evaporate. Such insulation may be accomplished by use of double-walled containers, such as Dewar flasks, or by thick layers of insulation.

With some produce, such as lettuce, which is relatively immune to damage from possible anaerobic respiration, oxygen level is sometimes controlled at some point set between 0% and 1%, since certain microorganisms such as molds, bacteria and decay-causing fungi will not grow in such an atmosphere.

A further important feature of the present invention is the refrigeration of the compartment during transportation so that the degradation of the produce is further inhibited. In a preferred form of the present invention, commercially available compressor-evaporator equipment is installed in the front end of the compartment, assuming the compartment is a trailer or truck, or in another convenient location. Operation of this equipment reduces the temperature of the compartment to a satisfactory level such as about 33° F. The capacity of conventional refrigeration equipment of this type for economic reasons is limited so that the temperature of the produce is not brought down immediately, but only after the passage of a considerable time. Hence the initial degradation heretofore described is not inhibited by this type of refrigeration equipment alone. In fact, due to the high rate of heat emission of warm produce, at field temperatures, such in-transit refrigeration equipment is incapable of cooling down produce loaded at field temperatures when respiration is allowed to proceed in a normal air atmosphere. In accordance with the present invention, the refrigeration equipment merely supplements the inhibition of degradation accomplished by oxygen displacement.

A feature and advantage of the present invention is the use of equipment permitting the gases to be carried in liquid form, thereby maintaining the weight and cost of the equipment at a minimum while providing enough gas capacity to emit the large quantities of gas initially required to purge the compartment, as well as to emit lesser quantities of gas over a prolonged period of time while the compartment is being transported to maintain the oxygen level low.

Another feature of the invention is the provision of oxygen measuring and level-controlling devices which are rugged and accurate. Such controls may be powered by the gas pressure in the unit and supplemented by small batteries for elecrical controls which have a long life. Thus, the equipment is essentially self-contained and there is considerable portability between different compartments.

In the preferred form of the apparatus hereinafter described, the equipment, and particularly the nitrogen tank, is carried externally to the refrigeration compartment and thus does not occupy cargo space. As a safety feature, the safety pressure valve of the nitrogen tank is preferably vented to the outside of the compartment, thereby reducing the extreme danger to personnel which arises when the tanks are transported inside the compartment and the oxygen level has been reduced below safe conditions for humans by escape of nitrogen through the pressure relief valve. A further safety feature is the use of an oxygen analyzer with a visible indicator gauge which warns if the compartment is below a safe oxygen level.

Another feature of the invention is the provision of a gas supply sufficient to purge the compartment together with control equipment for the emission of such gas which enables a proper atmosphere to be established very rapidly. Further, this system makes practical the use of the invention on substantially all existing produce-hauling trailers, containers and rail cars, without expensive modification, even though they have widely varying air leakage rates. Accordingly, the present invention can reduce the oxygen level set between ½% to 4% within a ten-minute period after the cargo has been loaded into the compartment and the doors closed. Hence, the decomposition of the produce occurs at full rate only during such ten-minute period and is thereafter greatly inhibited. After the initial purging, the gas supply and the control equipment maintain the oxygen level carefully by a reduced flow of nitrogen. The equipment and controls are such that the ratio between the purge rate and the transportation rate of emission of the nitrogen is in the neighborhood of from 500 to 1.

The present invention has had outstanding results in improvement in the condition of produce after transportation. Where oxygen level has been maintained in the neighborhood of ½% to 4% and the temperature of the compartment has been brought down and maintained in the neighborhood of 35° F., produce stays fresh and edible up to three times as long as conventional transportation methods. The rate of decline of sugar content, tenderness and fresh appearance of the produce is likewise greatly decreased. Thus the market value as well as the shelf life of the produce after delivery are greatly enhanced. Conversely, where the oxygen in the atmosphere is reduced to the levels indicated, perishable produce may be transported under conditions of up to 30° F. higher than optimum transport and storage levels presently prevailing for periods of up to one week without experiencing any more deleterious degradation due to respiration than occurs normally in air under optimum low temperature holding conditions. Accordingly, the present invention provides a cure for the major causes of loss of market value of produce between the field and the terminal market. The invention eliminates the need for many of the steps of rehandling now necessary between field and the beginning of transportation. It will be understood that much degradation takes place during such rehandling and hence the present invention has a further benefit in the market value of the produce.

Other objects of the present invention will become apparent upon reading the following specification and referring to the accompanying drawings in which similar characters of reference represent corresponding parts in each of the several views.

In the drawings:

FIG. 1 is a schematic view of a trailer in which the system of this invention is installed at the time of loading cargo.

FIG. 2 is a view similar to FIG. 1, immediately after purging of oxygen.

FIG. 3 is a view similar to FIG. 1, after prolonged refrigeration.

FIG. 4 is an enlarged cross-section through the trailer.

FIG. 5 is a view similar to FIG. 4, of a modified system.

FIG. 6 is a view similar to FIG. 4, of a further modified system.

FIG. 7 is a piping diagram of one form of the system of FIG. 1.

FIG. 8 is a graph showing, for different kinds of produce, rate of respiration plotted against oxygen level at constant temperature.

The equipment illustrated in the accompanying drawings is schematic and is subject to considerable variation. Essentially there is provided a cargo compartment 11, having a floor 12, roof 13, sides 14, and front end 16. The rear end is preferably closed by doors 17, but doors may be located on the sides. Although compartment 11 may be stationary (as for storage) or may be in the form of a lift van, nevertheless, a common form of compartment is a trailer of the highway type having wheels 18 and a retractable support 19, and which may be moved by a tractor 21 or transported "piggy-back" on railway equipment, or "fishy-back" on ships. Preferably, the sides 14, ends 16, 17, floor 12, and roof 13, are insulated to reduce heat loss. Particularly where compartment 11 is a highway trailer, the preferred equipment uses a conventional highway-type refrigerator having a compressor and condenser 22 installed at the top of front end 16. It will be understood that other mechanical means may be used for refrigeration and other refrigeration means, such as ice or gas evaporation may be used.

Produce, such as crates 23 of fresh fruits and vegetables, is loaded into compartment 11 in normal manner and doors 17 are closed.

In accordance with the present invention, one or more tanks 26 of liquid nitrogen or mixtures of nitrogen and other gases, such as argon, are used. Tank 26 is supported by brackets 27 extending below floor 12, so that tank 26 extends transversely or longitudinally below floor 12. Tank 26 is, of course, pressure and shock resistant and for such purpose a Dewar flask is desirable or a metal container suitably insulated with polyurethane foam insulation. A pipe 31 runs from tank 26 into compartment 11, preferably to a central location near roof 13 and a plurality of spray holes 32 is formed in pipe 31 so that the liquid rapidly evaporates after emission. Tank 26 has a safety pressure relief valve 33 connected into its head-space which vents gaseous nitrogen to the outside when pressure exceeds a safe level for the strength of tank 26.

The valving equipment of tank 26 is likewise subject to considerable variation. As shown in FIG. 7, regulator valve 36 in pipe 31 is controlled by solenoid 37. Mounted in the interior of the compartment is an oxygen sensor 38, a commercially available type of equipment which is responsive to the percentage of oxygen in the atmosphere to which it is subjected within narrow limits around some set point chosen on meter 39 within ½% to 4%. Sensor 38 may be a Beckman polarographic oxygen analyzer, Model 764 (modified), as made under Patent No. 2,913,386. By means of a relay, or directly through mechanical or electrical connection, sensor 38 controls solenoid 37. Normally, valve 36 is closed and is opened only for short periods to emit nitrogen.

In the system shown in FIG. 7, tank 26 is filled through valve 44 with all valves shut except 44. Excess gas pressure will relieve through relief valve 33 only when tank pressure reaches 45 p.s.i.g. Vent valve 41 and vent fitting 40 may be used to remove some or all gas from the system, or allow faster filling. When the system is turned on by switch 46, an oxygen level reading on meter 39 above set point will close meter relay 48, closing the circuit from source 47 and activating solenoid 37, opening valve 36, allowing nitrogen to flow up tube 41 to distribution header 32. Before liquid will flow, pressure in the tank must be relieved to 20 p.s.i.g. by back-pressure regulating valve 43. This valve 43 opens whenever pressure upstream exceeds 20 p.s.i.g. and closes whenever upstream pressure falls below 20 p.s.i.g.; its regulation is independent of downstream pressures, thus providing a true economizer circuit. Thus, until valve 43 closes, gas alone, from tank headspace, will flow through tube G to valve 36; after pressure in the tank has been reduced to setting of valve 43, which is considered the working pressure of the system, and valve 43 closes, then liquid nitrogen flows through tube L when so called for by the opening of valve 36. Since constant evaporation of liquid nitrogen is occurring within tank 26 due to heat leak from the outside, this economizer circuit assures that vaporized gas will always be constructively utilized within the atmosphere control system rather than wasted through relief valve 33. Since in a moving, and thus sloshing tank, head space pressure will build up no faster than the entire bulk of liquid remaining in tank 26 can be brought to equilibrium condition regarding pressure and temperature, considerable "stand-by" time is possible with this economizer circuit, during which no gas will be lost by relief through valve 33.

If at the time than tank 26 is being filled with nitrogen, produce 23 has already been loaded into compartment 11 and doors 17 have been closed, purge valve 42 is opened instead of vent valve 41 during the filling period, and thus gas that would normally be lost during the filling process is utilized instead for the initial purge of compartment 11.

Tank 26 can be filled through valve 41 and fitting 40 instead of valve 44 and fitting 45 if filling equipment of suitable pressure handling capability is available, and in this case valve 42 is left closed. When filling is completed valve 42 is closed and valve 36 controls thereafter.

In the modification of FIG. 5, tank 26b is mounted inside the compartment 11b. Other elements of the system are designated with the same reference numerals as in the preceding modification followed by the subscripts b and c.

Still another modification as illustrtated in FIG. 6, wherein oxygen sensor 38c and control equipment, as well as an emission nozzle 46c of the spray type, are installed on the top of tank 26 itself. The unit is thus self-contained and may be installed and removed rapidly. Other elements of this modification are similar to the previous and corresponding parts are marked with the same reference numerals followed by subscript c.

The control equipment by which sensors 38, 38b and 38c regulate valve 36, 36b, 36c, may be actuated by a battery, by a plug-in into the vehicle electrical system, by a combination of a small battery and pneumatic operation pressure by the gas in the container, or by a mechanical linkage between the oxygen sensor and valve 36. Where electrical means is used, a relay (not shown) is preferably used.

At the commencement of operation, compartment 11 is filled with normal air which has an oxygen percentage of about 20%. The temperature of compartment 11 is that of the surrounding air or field temperature which is here assumed to be 80° F. It is also assumed that the temperature of the cargo 23 of produce which is loaded into compartment 11 is at field temperature. This condition is shown in FIG. 1. After loading, doors 17 are closed. An airtight closure is not desirable and it cannot, be course, be achieved in practice with standard refrigeration truck equipment.

After the produce has been loaded, sensor 38 senses excess oxygen and opens regulator valve 36 rapidly, emitting into compartment 11 a large volume of nitrogen as gas or as a liquid, which rapidly vaporizes into gas and which is approximately seven or eight times the total volume of the remaining airspace in compartment 11. The nitrogen rapidly diffuses throughout compartment 11, containers 23 for the produce, and into the produce itself. It will be noted that this is a diffusing action and that convection is not essential to the operation. The emission of such a large initial volume of nitrogen into the compartment "purges" the atmosphere of air by dilution and expulsion, bringing the oxygen content down to the desired set point between ½% to 4%. Preferably, this is accomplished within a time period of about ten minutes. Vaporization of such a large quantity of liquified nitrogen accomplishes a certain amount of refrigeration of the compartment, but because such refrigeration is incidental to the main purpose of the purging of the air by the emission of nitrogen, the temperature as shown in FIG. 2 is still indictaed at field temperature of 80° F., although the temperature would actually be lower.

After the purging of the compartment, oxidation of the produce due to respiration is greatly reduced and hence the rapid loss of quality of the produce through such degradation is limited to a time period of ten minutes, which is nearly always sufficiently short that no commercial value is lost.

After the initial purging of the compartment, compartment 11 may be transported long distances, either by tractor 21 or by railway equipment, or other means heretofore mentioned. Preferably during such transportation, mechanical refrigeration equipment 22 is operated which reduces the temperature inside compartment 11 to a material extent, such as to the 35° F. indicated in FIG. 3. A cargo temperature range of 33° F. to 35° F. is very suitable for most products and this is usually attained over a period of 12 to 72 hours.

Some products, such as lettuce, give longest market shelf life if carried at higher temperature, such as 60° F. Precooled loads also can be loaded, and such condition is preferred when handling soft fruits.

Ice can be the additional refrigerant and in many cases today, particularly when compartment 11 is a railway car, ice is still used to refrigerate produce in transit. When the atmosphere control device is used in conjunction with the ice refrigeration, two of the great disadvantages of ice refrigeration are overcome: (1) Much less ice is used, since in the usual produce haul the heat of respiration, even of a precooled load of produce, is often three to six times that of the heat that comes in through the walls of the container due to heat transmission from outside ambient conditions or sun's radiation, and (2) the corallary effect—that of having to stop a train nightly for reicing—is avoided, since one loading of ice at destination will hold the load and handle the remaining refrigeration load all the way to destination in many cases. It can be seen that the effect of (1) is that of greatly decreased cost, since the cost of ice is quite high today compared to what it was when ice cars were first developed; the effect of (2) is not only the inherently lesser cost of using less ice but also the tangible and considerable saving accomplished by not having to stop a train every night of a six-day journey to spend three to six hours reicing all of the cars.

As the transportation or storage of the produce continues, there is a certain amount of leakage of air from the exterior into compartment 11 and, also, certain gases are emitted by the produce. The oxygen sensor 38 senses the presence of oxygen in excess of set point and whenever such percentage is exceeded, an additional quantity of nitrogen is released into the compartment to diffuse through the atmosphere and bring the oxygen level down to the desired range. The quantity of nitrogen normally released in this manner after the initial purging is relatively small, and hence a tank 26 of liquid nitrogen, or other inert gas, will satisfy all normal requirements for transportation for long distances and over prolonged periods of time, such as two weeks.

Sensor 38 likewise maintains the oxygen level in compartment 11 during transportation above ½%, or other level, which inhibits anaerobic degradation of the produce, depending upon the product.

When the cargo has reached its destination, it will be found that its condition is far superior to that of other means of transportation. Transportation over a two-week period under these conditions is very satisfactory and more prolonged periods are likewise commercially feasible.

The term "liquified nitrogen" has been used herein in a generic sense. It will be understood that other gases inert to produce or mixtures may be used. Liquified gases are transported most economically and conveniently and vaporization thereof adds to the effectiveness of the refrigeration system. However, gases in non-liquid form may be used in the system.

Although the foregoing invention has been described in some detail, by way of illustration and example for purposes of clarity of understanding, it is understood that certain changes and modifications may be practiced within the spirit of the invention and scope of the appended claims.

What is claimed is:

1. A method of protecting fresh fruits and vegetables during transportation against degradation when enclosed in a compartment, comprising:

loading fruits and vegetables into said compartment at about field temperature and substantially enclosing said compartment at atmospheric pressure against ingress of atmosphere;

initially rapidly introducing into said compartment a volume of gas of the group consisting of nitrogen and argon to diffuse throughout said compartment to purge rapidly said compartment and said fruits and vegetables to reduce the oxygen level in said compartment to the range of ½% to 4% within a time period such that further substantial degradation of said fruits and vegetables does not occur;

and then over an extended period of time during transport introducing into said compartment, at varying rates of flow, additional small volumes of said gas, said varying rates of flow being substantially less than during the step of initially rapidly purging, to maintain the oxygen level in said compartment in the range of ½% to 4%, while maintaining the temperature of said compartment and fruits and vegetables in the range between 33° and 60° F.

2. The method of claim 1, in which said gas is transported in a liquified state.

3. The method of claim 1, in which the step of initially rapidly introducing said gas into said compartment is conducted within a period of time of about ten minutes.

References Cited by the Examiner

UNITED STATES PATENTS

| | | | |
|---|---|---|---|
| 334,967 | 1/1936 | McMurray | 99—270 |
| 2,309,007 | 1/1943 | Parsons | 99—269 |
| 2,569,217 | 9/1951 | Bagdigian | 99—189 X |
| 2,583,697 | 1/1952 | Hendry et al. | 99—189 X |
| 2,789,059 | 4/1957 | Lindewald | 99—189 |
| 2,894,845 | 7/1959 | Stoddard | 99—193 |
| 2,948,123 | 8/1960 | Morrison | 99—198 X |
| 2,955,940 | 10/1960 | Williams | 99—154 |
| 3,102,777 | 9/1963 | Bedrosian et al. | |
| 3,107,171 | 10/1963 | Robinson | 99—154 |

FOREIGN PATENTS 457,888  12/1936  Great Britain.

A. LOUIS MONACELL, *Primary Examiner.*

HYMAN LORD, *Examiner.*